United States Patent [19]

Weber et al.

[11] Patent Number: 4,877,547

[45] Date of Patent: Oct. 31, 1989

[54] LIQUID CRYSTAL DISPLAY ELEMENT

[75] Inventors: Georg Weber, Erzhausen, Fed. Rep. of Germany; Bernhard Scheuble, Yokohama, Japan; Joachim Krause, Dieburg, Fed. Rep. of Germany

[73] Assignee: Merck Patent Gesellschaft mit Beschränkter Haftung, Darmstadt, Fed. Rep. of Germany

[21] Appl. No.: 124,791

[22] PCT Filed: Feb. 14, 1987

[86] PCT No.: PCT/EP87/00078

§ 371 Date: Oct. 23, 1987

§ 102(e) Date: Oct. 23, 1987

[87] PCT Pub. No.: WO87/05317

PCT Pub. Date: Sep. 11, 1987

[30] Foreign Application Priority Data

Feb. 26, 1986 [DE] Fed. Rep. of Germany ....... 3606153

[51] Int. Cl.$^4$ .......................... G02F 1/13; G09F 9/35; C09K 19/42; C09K 19/08; C09K 19/30/19/20; C09K 19/34
[52] U.S. Cl. .......................... 252/299.61; 252/299.01; 252/299.5; 252/299.63; 252/299.64; 252/299.65; 252/299.66; 252/299.67; 350/350 R
[58] Field of Search ........... 252/299.01, 299.5, 299.61, 252/299.63, 299.64, 299.65, 299.66, 299.67, 299.6; 350/350 R

[56] References Cited

U.S. PATENT DOCUMENTS

| | | |
|---|---|---|
| 4,464,283 | 8/1984 | Hasegawa et al. ............. 252/299.63 |
| 4,469,618 | 9/1984 | Hasegawa et al. ............. 252/299.63 |
| 4,483,595 | 11/1984 | Irving et al. ................... 252/299.63 |
| 4,490,276 | 12/1984 | Hsu ................................ 252/299.61 |
| 4,528,115 | 7/1985 | Ishii et al. ....................... 252/299.63 |
| 4,528,116 | 7/1985 | Dabronski et al. ............. 252/299.63 |
| 4,536,321 | 8/1985 | Sugimori et al. .............. 252/299.63 |
| 4,551,280 | 11/1985 | Sasaki et al. ................... 252/299.63 |
| 4,621,901 | 11/1986 | Petrzilea et al. ............... 252/299.63 |
| 4,622,162 | 11/1986 | Kimura et al. ................. 252/299.63 |
| 4,670,182 | 6/1987 | Fujita et al. .................... 252/299.63 |
| 4,676,924 | 6/1987 | Dabrowski et al. ........... 252/299.61 |
| 4,707,296 | 11/1987 | Sugimori et al. .............. 252/299.67 |
| 4,726,911 | 2/1988 | Krause et al. .................. 252/299.61 |
| 4,737,311 | 4/1988 | Scheuble et al. .............. 252/299.61 |
| 4,770,503 | 9/1988 | Buchecker et al. ............ 252/299.63 |
| 4,776,973 | 10/1988 | Bofinger et al. ............... 252/299.61 |
| 4,797,228 | 1/1989 | Goto et al. ...................... 252/299.63 |
| 4,814,523 | 3/1989 | Tanaka et al. .................. 253/299.63 |
| 4,815,825 | 3/1989 | Nakagomi et al. ............. 252/299.63 |
| 4,818,428 | 4/1989 | Scheuble et al. .............. 252/299.63 |
| 4,820,443 | 4/1989 | Goto et al. ...................... 252/299.63 |
| 4,822,519 | 4/1989 | Saito et al ...................... 252/299.63 |

FOREIGN PATENT DOCUMENTS

| | | |
|---|---|---|
| 168012 | 1/1986 | European Pat. Off. ........ 252/299.61 |
| 8603769 | 7/1986 | World Int. Prop. O. ...... 252/299.61 |
| 8605799 | 10/1986 | World Int. Prop. O. ...... 252/299.61 |

*Primary Examiner*—Teddy S. Gron
*Attorney, Agent, or Firm*—Millen, White & Zelano

[57] ABSTRACT

The invention relates to a new liquid crystal display element with static or multiplex control with a low multiplex ratio and an operating voltage below 3.3 volts, containing a liquid crystal dielectric, wherein the operating temperature range extends from −30° C. to +80° C. and the viscosity of the dielectric at 20° C. is less than 40 mPa.s.

7 Claims, No Drawings

LIQUID CRYSTAL DISPLAY ELEMENT

The invention relates to a liquid crystal display element (LC display element) with a low multiplex ratio and low operating voltage.

For LC display elements, the properties of nematic or nematic-cholesteric liquid crystal materials are utilized to modify their optical properties, such as absorption of light, light scattering, birefringence, reflectance or color, under the influence of electrical fields. Functioning of such display elements is based here, for example, on the phenomenon of dynamic scattering, the deformation of aligned phases, the guest-host effect, the Schadt-Helfrich effect in the twisted cell or the cholesteric-nematic phase transfer.

LC phases which must meet a number of requirements are required for technical use of these effects in electronic components. mechanical stability towards moisture, air and physical influences, such as heat, radiation in the infrared, visible and ultraviolet range and constant and alternating electrical fields, are particularly important here. Technically usable LC phases are also required to have a liquid crystal mesophase in a suitable temperature range, a low viscosity, a low optical anisotropy, a high gradient of the electrooptical characteristic line and an adequate dissolving power for pleochroic dyestuffs.

In none of the series of compounds so far known with a liquid crystal mesophase is there a single compound which meets all these requirements. Mixtures of two to 25, preferably three to 18, compounds are therefore prepared in order to obtain substances which can be used as LC phases. However, optimum phases cannot easily be prepared in this manner, since components with high melting and clear points frequently also impart to the mixtures a high viscosity. The switching times of the electrooptical display elements produced with these components are thereby modified in an undesirable manner.

There is therefore still a great need for LC phases with a wider operating temperature range, a low viscosity (and therefore short switching times) and a low threshold voltage.

Most LC display elements produced today are controlled in multiplex operation with multiplex ratios of about 1:2 to 1:4 and with operating voltages of about 3 volts. The operating temperature range of such display elements is in general between about $-10°$ and $+50°$.

However, a wider operating temperature range is desirable for applications in the open air, for example also in cars.

The invention is based on the object of providing LC display elements which have a wide operating temperature range and display the abovementioned disadvantages to only a small extent, if at all.

It has been found that this object can be achieved if liquid crystal dielectrics which have operating temperature ranges of between $-30°$ and $+80°$ C. and viscosities of less than 40 mPa.s at $20°$ are used in these display elements.

The invention thus relates to an LC display element with static or multiplex control with a low multiplex ratio and an operating voltage below 3.3 volts, containing a liquid crystal dielectric, wherein the operating temperature range extends from $-30°$ C. to $+80°$ C. and the viscosity of the dielectric at $20°$ C. is less than 40 mPa.s.

The invention particularly relates to LC display elements of the type mentioned, in which the threshold voltage of the dielectric is not more than 1.7, preferably not more than 1.5 volts.

The invention furthermore relates to LC display elements, wherein the dielectric contains at least one component of one of the formulae I to VII:

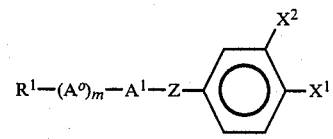

wherein $R^1$ is alkyl with 1 to 12 C atoms, wherein one or two non-adjacent $CH_2$ groups can also be replaced by O atoms, —CO—, —O—CO—, —CO—O— and/or —CH=CH— groups, $A^o$ and $A^1$ each independently of one another are Cy, Dio or Phe, Z is —CO—O—, —O—CO—, —CH$_2$—O—, —O—CH$_2$— or a single bond, $X_1$ is F, Cl, —CN or —NCS, $X^2$ is F, Cl or, in the case where $X^1$=NCS, also H, m is 0 or 1, Cy is trans-1,4-cyclohexylene, Dio is trans-1,3-dioxane-2,5-diyl and Phe is 1,4-phenylene which is unsubstituted or substituted by fluorine;

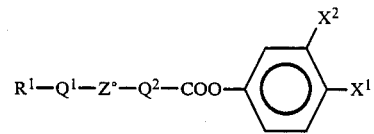

wherein $R^1$, have the meanings given in the case of $X^1$ and $X^2$ formula I, $Q^1$ is trans-1,4-cyclohexylene, wherein one or two non-adjacent $CH_2$ groups can also be replaced by O and/or S, $Q^2$ is trans-1,4-cyclohexylene, wherein one or two non-adjacent $CH_2$ groups can also be replaced by O and/or S, or 1,4-phenylene which is unsubstituted or substituted by fluorine and wherein one or more CH groups can be replaced by N, and $Z^o$ is —CO—O—, —CH$_2$O— or —CH$_2$CH$_2$—;

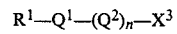

wherein $R^1$ has the meanings given in the case of formula I, $Q^1$ and $Q^2$ have the meanings given in the case of formula II, n is 1 or 2 and $X^3$ is —CN or —NCS;

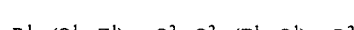

wherein $Q^1$ and $Q^2$ (each independently of one another) have the meanings given in the case of formula II, $R^1$ and $R^2$ each independently of one another are alkyl with 1 to 12 C atoms, wherein one or two non-adjacent $CH_2$ groups can also be replaced by —O—, —CO—, —O—CO—, —CO—O— and/or —CH=CH—, the symbols $Z^1$ each independently of one another are —CO—O—, —O—CO—, —CH$_2$O—, —OCH$_2$— —CH$_2$CH$_2$— or a single bond, and m and P are each 0 or 1;

$$R^1\text{—Cy—}Q^o\text{—}R^2 \qquad \qquad V$$

wherein $Q^o$ is Cy or Phe and

Phe and Cy have the meanings given in the case of formula I, and $R^1$ and $R^2$ have the meanings given in the case of formula IV;

$$R^1\text{—Phe—Phe—CN} \qquad \qquad VI$$

wherein $R^1$ and Phe have the meanings given in the case of formula I;

$$R^1\text{—}(Q)_n\text{—COO—Phe—}R^2 \qquad \qquad VII$$

wherein Phe has the meanings given in the case of formula I, $R^1$ and $R^2$ have the meanings given in the case of formula IV, $R^2$ is also CN, Q is trans-1,4-cyclohexylene, wherein one or two non-adjacent CH$_2$ groups can also be replaced by O and/or S, or Phe and n is 1 or 2, and if n=2, the two groups Q can be identical or different from one another.

Finally, the invention relates to a liquid crystal dielectric with an operating temperature range of −30° to +80° C., a viscosity of less than 40, preferably less than 30 mPa.s at 20° C. and a threshold voltage of not more than 1.7, preferably not more than 1.5 volts.

Preferred compounds of the formulae I to VII correspond to the following part formulae (wherein FCP is the 3-fluoro-4-cyanophenyl radical):

| | |
|---|---|
| R$^1$—Phe—COO—FCP | Ia |
| R$^1$—Cy—Phe—COO—FCP | Ib |
| R$^1$—Dio—Phe—COO—FCP | Ic |
| R$^1$—Cy—Phe—CN | IIIa |
| R$^1$—Cy—Phe—Phe—CN | IIIb |
| R$^1$—Dio—Phe—CN | IIIc |
| R$^1$—Cy—Phe—Phe—R$^2$ | IVa |
| R$^1$—Cy—Phe—Phe—Cy—R$^2$ | IVb |

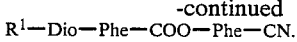

IVc

| | |
|---|---|
| R$^1$—Cy—Cy—COO—Cy—R$^2$ | IVd |
| R$^1$—Cy—Cy—R$^2$ | Va |
| R$^1$—Cy—Phe—R$^2$ | Vb |
| R$^1$—Phe—Phe—CN | VI |
| R$^1$—Phe—COO—Phe—CN | VIIa |
| R$^1$—Dio—Phe—COO—Phe—CN. | VIIb |

Other preferred compounds correspond to the following part formulae:

| | |
|---|---|
| R$^1$—Cy—FCP | Ic |
| R$^1$—Dio—FCP | Id |
| R$^1$—Phe—FCP | Ie |
| R$^1$—Cy—Dio—FCP | If |
| R$^1$—Dio—Cy—FCP | Ig |
| R$^1$—Cy—Cy—FCP | Ih |
| R$^1$—Cy—Phe—FCP | Ii |
| R$^1$—Phe—Cy—FCP | Ij |
| R$^1$—Phe—Dio—FCP | Ik |
| R$^1$—Dio—Phe—FCP | Il |
| R$^1$—Cy—COO—FCP | Im |
| R$^1$—Dio—COO—FCP | In |
| R$^1$—Dio—Cy—COO—FCP | Io |
| R$^1$—Cy—Cy—COO—FCP | Ip |
| R$^1$—Phe—CH$_2$O—FCP | Iq |
| R$^1$—Phe—CH$_2$CH$_2$—Phe—COO—FCP | IIa |
| R$^1$—Cy—CH$_2$CH$_2$—Phe—COO—FCP | IIb |
| R$^1$—Phe—CH$_2$CH$_2$—Cy—COO—FCP | IIc |
| R$^1$—Cy—CH$_2$CH$_2$—Cy—COO—FCP | IId |
| R$^1$—Phe—CH$_2$—O—Phe—COO—FCP | IIe |
| R$^1$—Cy—Cy—CN | IIId |
| R$^1$—Phe—Cy—CN | IIIe |
| R$^1$—Dio—Cy—CN | IIIf |
| R$^1$—Dio—Cy—Phe—CN | IIIg |
| R$^1$—Cy—Cy—Phe—CN | IIIh |
| R$^1$—Cy—Cy—Phe—R$^2$ | IVe |
| R$^1$—Dio—Cy—Phe—R$^2$ | IVf |
| R$^1$—Cy—Cy—Cy—R$^2$ | IVg |
| R$^1$—Dio—Cy—Cy—R$^2$ | IVh |
| R$^1$—Cy—Phe—Cy—R$^2$ | IVi |
| R$^1$—Dio—Phe—Cy—R$^2$ | IVj |
| R$^1$—Cy—Phe—Phe—Dio—R$^2$ | IVk |
| R$^1$—Dio—Phe—Phe—Cy—R$^2$ | IVl |
| R$^1$—Cy—Phe—Cy—Cy—R$^2$ | IVm |
| R$^1$—Cy—Cy—Phe—Cy—R$^2$ | IVn |
| R$^1$—Cy—COO—Phe—Phe—R$^2$ | IVo |
| R$^1$—Dio—Cy—COO—Cy—R$^2$ | IVp |
| R$^1$—Dio—Phe—COO—Phe—R$^2$ | IVq |

-continued

| | |
|---|---|
| R¹—Dio—Phe—COO—Phe—R² | IVr |
| R¹—Cy—Cy—CH₂CH₂—Cy—R² | IVs |
| R¹—Cy—Phe—Phe—CH₂CH₂—Cy—R² | IVt |
| R¹—Cy—COO—Phe—CN | VIIc |
| R¹—Phe—Phe—COO—Phe—CN | VIId |
| R¹—Cy—Phe—COO—Phe—CN | VIIe |
| R¹—Phe—Cy—COO—Phe—CN | VIIf |
| R¹—Cy—Cy—COO—Phe—CN. | VIIg |

The radicals $R^1$ and $R^2$ are preferably in each case straight-chain alkyl with 1–9 C atoms, such as methyl, ethyl, propyl, butyl, pentyl, hexyl, heptyl, octyl or nonyl, or furthermore straight-chain alkoxy with 1–9 C atoms, such as methoxy, ethoxy, propoxy, butoxy, pentoxy, hexoxy, heptoxy, octoxy or nonoxy, or furthermore alkoxyalkyl with 2–9 C atoms such methoxymethyl or ethoxymethyl.

Phe is preferably an unsubstituted 1,4-phenylene group, or furthermore preferably a 2-fluoro-1,4-phenylene group.

The individual compounds of the formulae I to VII which can be used in the LC display elements according to the invention are known or can be prepared analogously to known compounds.

Preferred dielectrics which can be used according to the invention contain, for example, over 7–20% of I, 10–45% of III, 20–40% of IV, 8–50% of V, 0–5% of VI and 0–10% of VII. They contain in total preferably 10–20, in particular 12–18 components.

The operating temperature range of these dielectrics is between −30° and +80°, preferably between −40° and +85°. Their viscosity at 20° is less than 40, preferably less than 30 mPa.s and their threshold voltage is preferably not more than 1.7, in particular not more than 1.5 volts.

The dielectrics which can be used according to the invention are prepared in a manner which is customary per se. As a rule, the desired amount of the components used in the smaller amount is dissolved in the component which makes up the main constituent, advantageously at elevated temperature. It is also possible for solutions of the components in an organic solvent, for example in acetone, chloroform or methanol, to be mixed and for the solvent to be removed again, for example by distillation, after thorough mixing.

The dielectrics can also contain other additives which are known to the expert and are described in the literature. For example, 0–15% of pleochroic dyestuffs can be added, as well as conductive salts, preferably ethyldimethyldodecylammonium 4-hexoxybenzoate, tetrabutylammonium tetraphenylboranate or complex salts of crown ethers (compare, for example, Haller et al., Mol. Cryst. Liq. Cryst. Volume 24, pages 249–258 (1973)) for improving the conductivity or substances for modifying the dielectric anisotrophy, the viscosity and/or the orientation of the nematic phases. Such substances are described, for example, in German Offenlegungsschriften 2,209,127, 2,240,864, 2,321,632, 2,338,281, 2,450,088, 2,637,430 and 2,853,728.

The following examples are intended to illustrate the invention without limiting it.

The symbols have the following meanings:

S-N: Smectic-nematic phase transition temperature,
c.p.: Clear point,
visc.: Viscosity at 20° (mPa.s),
t.v.: Threshold voltage of a TN cell at 20°, observation angle 0° (perpendicular) and 10% contrast.

All the temperatures above and below are given in °C. The percentage figures are percentages by weight.

EXAMPLE 1

A mixture of
5% of p-trans-4-ethylcyclohexyl-benzonitrile
12% of p-trans-4-propylcyclohexyl-benzonitrile
8% of p-trans-4-butylcyclohexyl-benzonitrile
10% of p-trans-4-pentacyclohexyl-benzonitrile 6% of 3-fluoro-4-cyanophenyl p-ethylbenzoate
8% of 3-fluoro-4-cyanophenyl p-propylbenzoate
5% of 3-fluoro-4-cyanophenyl p-(trans-5-pentyl-1,3-dioxan-2-yl)-benzoate
16% of trans,trans-4-propylcyclohexyl-4'-propoxycyclohexane
9% of 4-ethyl-4'-(trans-4-propylcyclohexyl)-biphenyl
8% of 4-ethyl-4'-(trans-4-pentylcyclohexyl)-biphenyl
3% of 4,4'-bis-(trans-4-propylcyclohexyl)-biphenyl
3% of 4-(trans-4-pentylcyclohexyl)-4'-(trans-4-propylcyclohexyl)-biphenyl
3% of 2-fluoro-4,4'-bis-(trans-4-propylcyclohexyl)-biphenyl and
4% of 2-fluoro-4-(trans-4-pentylcyclohexyl)-4'-(trans-4-propylcyclohexyl)-biphenyl exhibits an S-N of less than −30°, a c.p. of +87°, a visc. of 27 and a t.v. of 1.4 V.

EXAMPLE 2

A mixture of
15% of p-trans-4-propylcyclohexyl-benzonitrile
6% of 3-fluoro-4-cyanophenyl p-ethylbenzoate
8% of 3-fluoro-4-cyanophenyl p-propylbenzoate
5% of 3-fluoro-4-cyanophenyl p-(trans-5-pentyl-1,3-dioxan-2-yl)-benzoate
13% of trans,trans-4-propyl-4'-propoxycyclohexyl-cyclohexane
13% of trans,trans-4-methoxy-4'-pentylcyclohexyl-cyclohexane
12% of trans,trans-4-ethoxy-4'-pentylcyclohexyl-cyclohexane
4% of trans-4-propylcyclohexyl trans,trans-4-propyl-cyclohexyl-cyclohexane-4'-carboxylate
4% of trans-4-pentylcyclohexyl trans,trans-4-propyl-cyclohexyl-cyclohexane-4'-carboxylate
4% of trans-4-propylcyclohexyl trans,trans-4-butyl-cyclohexyl-cyclohexane-4'-carboxylate
4% of trans-4-pentylcyclohexyl trans,trans-4-butyl-cyclohexyl-cyclohexane-4'-carboxylate
3% of 4,4'-bis-(trans-4-propylcyclohexyl)-biphenyl
3% of 4-(trans-4-pentylcyclohexyl)-4'-(trans-4-propylcyclohexyl)-biphenyl
3% of 2-fluoro-4,4'-(trans-4-propylcyclohexyl)-biphenyl
3% of trans-4-propylcyclohexyl-2-fluoro-4-(trans-4-pentylcyclohexyl)-4'-biphenyl exhibits an S-N of less than −30°, a c.p. of +89°, a visc. of 25 and a t.v. of 1.4 V.

EXAMPLE 3

A mixture of
15% of p-trans-4-propylcyclohexyl-benzonitrile
6% of t4rans-1-p-ethoxyphenyl-4-propylcyclohexane
3.6% of 3-fluoro-4-cyanophenyl p-ethylbenzoate 4.8% of 3-fluoro-4-cyanophenyl p-propylbenzoate
5% of 3-fluoro-4-cyanophenyl p-(trans-5-pentyl-1,3-dioxan-2-yl)-benzoate
13.8% of trans,trans-4-propyl-4'-propoxycyclohexyl-cyclohexane
13.4% of trans,trans-4-methoxy-4'-pentylcyclohexyl-cyclohexane
12.4% of trans,trans-4-ethoxy-4'-pentylcyclohexyl-cyclohexane
2.4% of trans-4-propylcyclohexyl trans,trans-4-propylcyclohexyl-cyclohexane-4'-carboxylate
2.4% of trans-4-pentylcyclohexyl trans,trans-4-propylcyclohexyl-cyclohexane-4'-carboxylate
2.4% of trans-4-propylcyclohexyl trans,trans-4-butyl-cyclohexyl-cyclohexane-4'-carboxylate
2.4% of trans-4-pentylcyclohexyl trans,trans-4-butyl-cyclohexyl-cyclohexane-4'-carboxylate
3% of 4,4'-bis-(trans-4-propylcyclohexyl)-biphenyl
4.2% of 4-(trans-4-pentylcyclohexyl)-4'-(trans-4-propylcyclohexyl)-biphenyl
1.6% of 4,4'-bis-(trans-4-pentylcyclohexyl)-biphenyl
3.4% of 2-fluoro-4,4'-bis-(trans-4-propylcyclohexyl)-biphenyl
4.2% of 2-fluoro-4-(trans-4-pentylcyclohexyl)-4'-(trans-4-propylcyclohexyl)-biphenyl exhibits an S-N of less than −40°, a c.p. of +90°, a visc. of 21 and a t.v. of 1.6 V.

EXAMPLE 4

A mixture of
10% of p-trans-4-ethylcyclohexyl-benzonitrile
17% of p-trans-4-propylcyclohexyl-benzonitrile
9% of 2-p-cyanophenyl-5-propyl-1,3-dioxan
6% of 2-p-cyanophenyl-5-butyl-1,3-dioxan
5% of 3-fluoro-4-cyanophenyl p-ethylbenzoate 7% of 3-fluoro-4-cyanophenyl p-propylbenzoate
4% of p-cyanophenyl p-ethylbenzoate
4% of p-cyanophenyl p-pentylbenzoate
14% of trans,trans-4-propyl-4'-propoxycyclohexyl-cyclohexane
4% of 4-ethyl-4'-(trans-4-propylcyclohexyl)-biphenyl
3% of 4-ethyl-4'-(trans-4-(trans-4-pentylcyclohexyl)-biphenyl
4% of 4,4'-bis-(trans-4-propylcyclohexyl)-biphenyl
5% of 4-(trans-4-pentylcyclohexyl)-4'-(trans-4-propylcyclohexyl)-biphenyl
4% of 2-fluoro-4,4'-bis-(trans-4-propylcyclohexyl)-biphenyl
4% of 2-fluoro-4-(trans-4-pentylcyclohexyl)-4'-(trans-4-propylcyclohexyl)-biphenyl exhibits an S-N of less than −30°, a c.p. of +85°, a visc. of 31 and a t.v. of 1.4 V.

EXAMPLE 5

A mixture of
5% of p-trans-4-ethylcyclohexyl-benzonitrile
17% of p-trans-4-propylcyclohexyl-benzonitrile
8% of p-trans-4-butylcyclohexyl-benzonitrile
10% of p-trans-4-pentylcyclohexyl-benzonitrile
3% of 4-ethyl-4'-cyanobiphenyl
6% of 3-fluoro-4-cyanophenyl p-ethylbenzoate
8% of 3-fluoro-4-cyanophenyl p-propylbenzoate
5% of 4-cyano-4'-(trans-4-pentylcyclohexyl)-biphenyl
9% of trans-1-p-ethoxyphenyl-4-propylcyclohexane
11% of 4-ethyl-4'-(trans-4-propylcyclohexyl)-biphenyl
9% of 4-ethyl-4'-(trans-4-pentylcyclohexyl)-biphenyl
3% of 4,4'-bis-(trans-4-propylcyclohexyl)-biphenyl
4% of 4-(trans-4-pentylcyclohexyl)-4'-(trans-4-propylcyclohexyl)-biphenyl
3% of 2-fluoro-4,4'-bis-(trans-4-propylcyclohexyl)-biphenyl
4% of 2-fluoro-4-(trans-4-pentylcyclohexyl)-4'-(trans-4-propylcyclohexyl)-biphenyl exhibits an S-N of less than =30°, a c.p. of +95°, a visc. of 28 and a t.v. of 1.5 V.

EXAMPLE 6

A mixture of
10% of p-trans-4-ethylcyclohexyl-benzonitrile
18% of p-trans-4-propylcyclohexyl-benzonitrile
10% of p-trans-4-pentylcyclohexyl-benzonitrile
5% of 3-fluoro-4-cyanophenyl p-ethylbenzoate
7% of 3-fluoro-4-cyanophenyl p-propylbenzoate
13% of trans-1-p-ethoxyphenyl-4-propylcyclohexane
9% of 4-ethyl-4'-(trans-4-propylcyclohexyl)-biphenyl
8% of 4-ethyl-4'-(trans-4-pentylcyclohexyl)-biphenyl
4% of 4,4'-bis-(trans-4-propylcyclohexyl)-biphenyl
5% of 4-(trans-4-pentylcyclohexyl)-4'-(trans-4-propylcyclohexyl)-biphenyl
4% of 4,4'-bis-(trans-4-pentylcyclohexyl)-biphenyl
3% of 2-fluoro-4,4'-bis-(trans-4-propylcyclohexyl)-biphenyl
4% of 2-fluoro-4-(trans-4-pentylcyclohexyl)-4'-(trans-4-propylcyclohexyl)-biphenyl exhibits an S-N of less than −30°, a c.p. of +95°, a visc. of 25 and a t.v. of 1.7 V.

EXAMPLE 7

A mixture of
6% of p-trans-4-ethylcyclohexyl-benzonitrile
16% of p-trans-4-propylcyclohexyl-benzonitrile
4% of 3-fluoro-4-cyanophenyl p-ethylbenzoate
4% of 3-fluoro-4-cyanophenyl p-propylbenzoate
6% of 3-fluoro-4-cyanophenyl p-pentylbenzoate
3% of p-cyanophenyl p-ethylbenzoate
2% of p-cyanophenyl p-pentylbenzoate
11% of trans,trans-4-propyl-4'-propoxycyclohexyl-cyclohexane
10% of trans,trans-4-methoxy-4'-pentylcyclohexyl-cyclohexane
10% of trans,trans-4-ethoxy-4'-pentylcyclohexylcyclohexane
4% of trans-4-propylcyclohexyl trans,trans-4-propyl-cyclohexyl-cyclohexane-4'-carboxylate
4% of trans-4-pentylcyclohexyl trans,trans-4-propyl-cyclohexyl-cyclohexane-4'-carboxylate
4% of trans-4-propylcyclohexyl trans,trans-4-butyl-cyclohexyl-cyclohexane-4'-carboxylate
3% of trans-4-pentylcyclohexyl trans,trans-4-butyl-cyclohexyl-cyclohexane-4'-carboxylate
4% of 4,4'-bis-(trans-4-propylcyclohexyl)-biphenyl
5% of 4-(trans-4-pentylcyclohexyl)-4'-(trans-4-propylcyclohexyl)-biphenyl
4% of 2-fluoro-4-(trans-4-pentylcyclohexyl)-4'-(trans-4-propylcyclohexyl)-biphenyl exhibits an S-N of less than −40°, a c.p. of +89°, a visc. of 25 and a t.v. of 1.3 V.

EXAMPLE 8

A mixture of
5% of p-trans-4-ethylcyclohexyl-benzonitrile
12% of p-trans-4-propylcyclohexyl-benzonitrile
8% of p-trans-4-butylcyclohexyl-benzonitrile
10% of p-trans-4-pentylcyclohexyl-benzonitrile 6% of 3-fluoro-4-cyanophenyl p-ethylbenzoate
8% of 3-fluoro-4-cyanophenyl p-propylbenzoate
5% of 3-fluoro-4-cyanophenyl p-(trans-4-pentylcyclohexyl)-benzoate
16% of trans,trans-4-propylcyclohexyl-4'-propoxycyclohexane
9% of 4-ethyl-4'-(trans-4-propylcyclohexyl)-biphenyl
8% of 4-ethyl-4'-(trans-4-pentylcyclohexyl)-biphenyl
3% of 4,4'-bis-(trans-4-propylcyclohexyl)-biphenyl
3% of 4-(trans-4-pentylcyclohexyl)-4'-(trans-4-propylcyclohexyl)-biphenyl
3% of 2-fluoro-4,4'-bis-(trans-4-propylcyclohexyl)-biphenyl
4% of 2-fluoro-4-(trans-4-pentylcyclohexyl)-4'-(trans-4-propylcyclohexyl)-biphenyl exhibits an S-N of less than −30°, a c.p. of +89°, a visc. of 26 and a t.v. of 1.4 V.

EXAMPLE 9

A mixture of
15% of p-trans-4-propylcyclohexyl-benzonitrile
6% of 3-fluoro-4-cyanophenyl p-ethylbenzoate
8% of 3-fluoro-4-cyanophenyl p-propylbenzoate
5% of o-fluoro-p-[trans-4-(trans-4-propylcyclohexyl)-cyclohexyl]-ethylbenzonitrile
13% of trans,trans-4-propyl-4'-propoxycyclohexylcyclohexane
13% of trans,trans-4-methoxy-4'-pentylcyclohexylcyclohexane
12% of trans,trans-4-ethoxy-4'-pentylcyclohexylcyclohexane
4% of trans-4-propylcyclohexyl trans-trans-4-propylcyclohexyl-cyclohexane-4'-carboxylate
4% of trans-4-pentylcyclohexyl trans,-trans-4-propylcyclohexyl-cyclohexane-4'-carboxylate
4% of trans-4-propylcyclohexyl trans,trans-4-butylcyclohexyl-cyclohexane-4'-carboxylate
4% of trans-4-pentylcyclohexyl trans-trans-4-butylcyclohexyl-cyclohexane-4'-carboxylate
3% of 4,4'-bis-(trans-4-propylcyclohexyl)-biphenyl
3% of 4-(trans-4-pentylcyclohexyl)-4'-(trans-4-propylcyclohexyl)-biphenyl
3% of 2-fluoro-4,4'-(trans-4-propylcyclohexyl)-biphenyl
3% of 2-fluoro-4-(trans-4-pentylcyclohexyl)-4'-(trans-4-propylcyclohexyl)-biphenyl exhibits an S-N of less than −30°, a c.p. of +84°, a visc. of 23 and a t.v. of 1.5 V.

EXAMPLE 10

A mixture of
15% of p-trans-4-propylcyclohexyl-benzonitrile
6% of trans-1-p-ethoxyphenyl-4-propylcyclohexane
3.6% of 3-fluoro-4-cyanophenyl p-ethylbenzoate
4.8% of 3-fluoro-4-cyanophenyl p-propylbenzoate
5% of o-fluoro-p-[trans-4-(trans-4-propylcyclohexyl)-cyclohexyl]-benzonitrile
13.8% of trans,trans-4-propyl-4'-propoxycyclohexylcyclohexane
13.4% of trans,trans-4-methoxy-40'-pentylcyclohexyl-cyclohexane
12.4% of trans,trans-4-ethoxy-4'-pentylcyclohexylcyclohexane
2.4% of trans-4-propylcyclohexyl trans,trans-4-propylcyclohexyl-cyclohexane-4'-carboxylate
2.4% of trans-4-pentylcyclohexyl trans,trans-4-propylcyclohexyl-cyclohexane-4'-carboxylate
2.4% of trans-4-propylcyclohexyl trans,trans-4-butylcyclohexyl-cyclohexane-4'-carboxylate
2.4% of trans-4-pentylcyclohexyl trans,trans-4-butylcyclohexyl-cyclohexane-4'-carboxylate
3% of 4,4'-bis-(trans-4-propylcyclohexyl)-biphenyl
4.2% of 4-(trans-4-pentylcyclohexyl)-4'-(trans-4-propylcyclohexyl)-biphenyl
1.6% of 4,4'-bis-(trans-4-pentylcyclohexyl)-biphenyl
3.4% of 2-fluoro-4,4'-bis(trans-4-propylcyclohexyl)-biphenyl
4.2% of 2-fluoro-4-pentylcyclohexyl)-4'-(trans-4-propylcyclohexyl)-biphenyl exhibits an S-N of less than −40°, a c.p. of +88°, a visc. of 19 and a t.v. of 1.7 V.

EXAMPLE 11

A mixture of
10% of p-trans-4-ethylcyclohexyl-benzonitrile
17% of p-trans-4-propylcyclohexyl-benzonitrile
9% of 2-p-cyanophenyl-4-propyl-1,3-dioxan
6% of 2-p-cyanophenyl-5-butyl-1,3-dioxan
5% of 3-fluoro-4-cyanophenyl p-ethylbenzoate
7% of 3-fluoro-4-cyanophenyl p-propylbenzoate
8% of p-[trans-4-propylcyclohexyl)-ethyl]isothiocyanatobenzene
14% of trans,trans-4-propyl-4'-propoxycyclohexylcyclohexane
4% of 4-ethyl-4'-(trans-4-propylcyclohexyl)-biphenyl
3% of 4-ethyl-4'-(trans-4-pentylcyclohexyl)-biphenyl
4% of 4,4'-bis-(trans-4-propylcyclohexyl)-biphenyl
5% of 4-(trans-4-pentylcyclohexyl)-4'-(trans-4-propylcyclohexyl)-biphenyl
4% of 2-fluoro-4,4'-bis-(trans-4-propylcyclohexyl)-biphenyl
4% of 2-fluoro-4-(trans-4-pentylcyclohexyl)-4'-(trans-4-propylcyclohexyl)-biphenyl exhibits an S-N of less than −30°, a c.p. of +86°. a visc of 27 and a t.v. of 1.5 V.

EXAMPLE 12

A mixture of
5% of p-trans-4-ethylcyclohexyl-benzonitrile
17% of p-trans-4-propylcyclohexyl-benzonitrile
8% of p-trans-4-butylcyclohexyl-benzonitrile
10% of p-trans-4-pentylcyclohexyl-benzonitrile
3% of 4-ethyl-4'-cyanobiphenyl
6% of 3-fluoro-4-cyanophenyl p-ethylbenzoate
8% of 3-fluoro-4-cyanophenyl p-propylbenzoate
5% of p-[trans-4-(trans-4-propylcyclohexyl)-cyclohexyl]-ethyl-isothiocyanatobenzene
9% of trans-1-p-ethoxyphenyl-4-propylcyclohexane
11% of 4-ethyl-4'-(trans-4-propylcyclohexyl)-biphenyl
9% of 4-ethyl-4'-(trans-4-pentylcyclohexyl)-biphenyl
3% of 4,4'-bis-(trans-4-propylcyclohexyl)-biphenyl
4% of 4-(trans-4-pentylcyclohexyl)-4'-(trans-4-propylcyclohexyl)-biphenyl
3% of 2-fluoro-4,4'-bis-(trans-4-propylcyclohexyl)-biphenyl
4% of 2-fluoro-4-(trans-4-pentylcyclohexyl)-4'-(trans-4-propylcyclohexyl)-biphenyl exhibits an S-N of less than −30°, a c.p. of +91°, a visc. of 25 and a t.v. of 1.55 V.

EXAMPLE 13

A mixture of
10% of p-trans-4-ethylcyclohexyl-benzonitrile
18% of p-trans-4-propylcyclohexyl-benzonitrile 10% of p-[trans-4-(trans-4-propylcyclohexyl)-cyclohexyl]-isothiocyanatobenzene
5% of 3-fluoro-4-cyanophenyl p-ethylbenzoate
7% of 3-fluoro-4-cyanophenyl p-propylbenzoate
13% of trans-1-p-ethoxyphenyl-4-propylcyclohexane
9% of 4-ethyl-4'-(trans-4-propylcyclohexyl)-biphenyl
8% of 4-ethyl-4'-(trans-4-pentylcyclohexyl)-biphenyl
4% of 4,4'-bis-(trans-4-propylcyclohexyl)-biphenyl
5% of 4-(trans-4-pentylcyclohexyl)-4'-(trans-4-propylcyclohexyl)-biphenyl
4% of 4,4'-bis-(trans-4-pentylcyclohexyl)-biphenyl
3% of 2-fluoro-4,4'-bis-(trans-4-propylcyclohexyl)-biphenyl
4% of 2-fluoro-4-(trans-4-pentylcyclohexyl)-4'-(trans-4-propylcyclohexyl)-biphenyl exhibits an S-N of less than −30°, a c.p. of +102°, a visc. of 26 and a t.v. of 1.8 V.

EXAMPLE 14

6% of p-trans-4-ethylcyclohexyl-benzonitrile
16% of p-trans-4-propylcyclohexyl-benzonitrile
4% of 3-fluoro-4-cyanophenyl p-ethylbenzoate
4% of 3-fluoro-4-cyanophenyl p-propylbenzoate
6% of 3-fluoro-4-cyanophenyl p-pentylbenzoate
5% of p-[trans-4-(5-hexenyl)-cyclohexyl]-isothiocyanatobenzene
11% of trans,trans-4-propyl-4'-propoxycyclohexyl-cyclohexane
10% of trans,trans-4-methoxy-4'-pentylcyclohexyl-cyclohexane
10% of trans,trans-4-ethoxy-4'-pentylcyclohexyl-cyclohexane
4% of trans-4-propylcyclohexyl trans,trans-4-propyl-cyclohexyl-cyclohexane-4'-carboxylate
4% of trans-4-pentylcyclohexyl trans,trans-4-propyl-cyclohexyl-cyclohexane-4'-carboxylate
4% of trans-4-propylcyclohexyl trans,trans-4-butyl-cyclohexyl-cyclohexane-4'-carboxylate
3% of trans-4-pentylcyclohexyl trans,trans-4-butyl-cyclohexyl-cyclohexane-4'-carboxylate
4% of 4,4'-bis-(trans-4-propylcyclohexyl)-biphenyl
5% of 4-(trans-4-pentylcyclohexyl)-4'-(trans-4-propylcyclohexyl)-biphenyl
4% of 2-fluoro-4-(trans-4-pentylcyclohexyl)-4'-(trans-4-propylcyclohexyl)-biphenyl exhibits an S-N of less than −40°, a c.p. of +91°, a visc. of 23 and a t.v. of 1.4 V.

EXAMPLE 15

A mixture of
4% of 3-fluoro-4-cyanophenyl p-ethylbenzoate
4% of 3-fluoro-4-cyanophenyl p-propylbenzoate
8% of 3-fluoro-4-cyanophenyl p-pentylbenzoate
6% of 3-fluoro-4-cyanophenyl p-heptylbenzoate
5% of 3-fluoro-4-cyanophenyl p-(trans-4-propylcyclohexyl)-benzoate
5% of 3-fluoro-4-cyanophenyl p-(trans-4-butylcyclohexyl)-benzoate
4% of 3-fluoro-4-cyanophenyl p-(trans-4-pentylcyclohexyl)-benzoate
19% of trans-1-p-methoxyphenyl-4-propylcyclohexane
17% of trans-1-p-methoxyphenyl-4-pentylcyclohexane
7% of trans,trans-4-propyl-4'-propoxycyclohexyl-cyclohexane
4% of 4-ethyl-4'-(trans-4-propylcyclohexyl)-biphenyl
4% of 4,4'-bis-(trans-4-propylcyclohexyl)-biphenyl
4% of 4,4'-bis-(trans-4-propylcyclohexyl)-2-fluorobiphenyl
5% of 4-(trans-4-pentylcyclohexyl)-4'-(trans-4-propylcyclohexyl)-biphenyl
4% of 4-(trans-4-pentylcyclohexyl)-4'-(trans-4-propylcyclohexyl)-2-fluorobiphenyl exhibits an S-N of less than −40°, a c.p. of +85°, a visc. of 30 and a t.v. of 1.4 V.

EXAMPLE 16

A mixture of
4% of 3-fluoro-4-cyanophenyl p-ethylbenzoate
6% of 3-fluoro-4-cyanophenyl p-propylbenzoate
12% of 3-fluoro-4-cyanophenyl p-pentylbenzoate
6% of 3-fluoro-4-cyanophenyl p-heptylbenzoate
5% of 3-fluoro-4-cyanophenyl p-(trans-4-propylcyclohexyl)-benzoate
7% of 3-fluoro-4-cyanophenyl p-(trans-4-butylcyclohexyl)-benzoate
4% of 3-fluoro-4-cyanophenyl p-(trans-4-pentylcyclohexyl)-benzoate
18% of trans-1-p-methoxyphenyl-4-propylcyclohexane
14% of trans,trans-4-propyl-4'-propoxycyclohexyl-cyclohexane
4% of 4-ethyl-4'-(trans-4-propylcyclohexyl)-biphenyl
3% of 4-ethyl-4'-(trans-4-pentylcyclohexyl)-biphenyl
4% of 4,4'-bis-(trans-4-propylcyclohexyl)-biphenyl
4% of 4,4'-bis-(trans-4-propylcyclohexyl)-2-fluorobiphenyl
5% of 4-(trans-4-pentylcyclohexyl)-4'-(trans-4-propylcyclohexyl)-biphenyl
4% of 4-(trans-4-pentylcyclohexyl)-4'-(trans-4-propylcyclohexyl)-2-fluorobiphenyl exhibits an S-N of less than −30°, a c.p. of +94°, a visc. of 38 and a t.v. of 1.2 V.

EXAMPLE 17

A mixture of
3% of 3-fluoro-4-cyanophenyl p-ethylbenzoate 4% of 3-fluoro-4-cyanophenyl p-propylbenzoate
10% of 3-fluoro-4-cyanophenyl p-pentylbenzoate
5% of 3-fluoro-4-cyanophenyl p-heptylbenzoate
5% of 3-fluoro-4-cyanophenyl p-(trans-4-propylcyclohexyl)-benzoate
6% of 3-fluoro-4-cyanophenyl p-(trans-4-butylcyclohexyl)-benzoate
4% of 3-fluoro-4-cyanophenyl p-(trans-4-pentylcyclohexyl)-benzoate
24% of trans-1-p-methoxyphenyl-4-propylcyclohexane
14% of trans,trans-4-propyl-4'-propoxycyclohexyl-cyclohexane
4% of 4-ethyl-4'-(trans-4-propylcyclohexyl)-biphenyl
4% of 4-ethyl-4'-(trans-4-pentylcyclohexyl)-biphenyl
4% of 4,4'-bis-(trans-4-propylcyclohexyl)-biphenyl
4% of 4,4'-bis-(trans-4-propylcyclohexyl)-2-fluorobiphenyl
5% of 4-(trans-4-pentylcyclohexyl)-4'-(trans-4-propylcyclohexyl)-biphenyl
4% of 4-(trans-4-pentylcyclohexyl)-4'-(trans-4-propylcyclohexyl)-2-fluorobiphenyl exhibits an S-N of less than −40°, a c.p. of +93°, a visc. of 31 and a t.v. of 1.5 V.

EXAMPLE 18

A mixture of
5% of 3-fluoro-4-cyanophenyl p-ethylbenzoate

5% of 3-fluoro-4-cyanophenyl p-propylbenzoate

3% of 3-fluoro-4-cyanophenyl p-(trans-4-propylcyclohexyl)-benzoate

7% of trans-1-p-methoxyphenyl-4-propylcyclohexane

21% of trans,trans-4-propyl-4'-propoxycyclohexylcyclohexane

21% of trans,trans-4-pentyl-4'-methoxycyclohexylcyclohexane

7% of trans,trans-4-pentyl-4'-ethoxycyclohexylcyclohexane

4% of trans-4-propylcyclohexyl trans,trans-4-propyl-cyclohexyl-cyclohexane-4'-carboxylate 5% of trans-4-pentylcyclohexyl trans,trans-4-propyl-cyclohexyl-cyclohexane-4'-carboxylate 5% of trans-4-propylcyclohexyl trans,trans-4-butyl-cyclohexyl-cyclohexane-4'-carboxylate 4% of trans-4-pentylcyclohexyl trans,trans-4-butyl-cyclohexyl-cyclohexane-4'-carboxylate 4% of 4,4'-bis-(trans-4-propylcyclohexyl)-2-fluorobiphenyl 4% of 4,4'-bis-(trans-4-pentylcyclohexyl)-2-fluorobiphenyl 5% of 4-(trans-4-pentylcyclohexyl)-4'-(trans-4-propylcyclohexyl)-2-fluorobiphenyl exhibits an S-N of less than −40°, a c.p. of +89°, a visc. of 30 and a t.v. of 2.0 V.

We claim:

1. A liquid crystal display element with static or multiplex control with a low multiplex ratio and an operating voltage below 3.3 volts, containing a liquid crystal dielectric, wherein the operating temperature range extends from −30° C. to +80° C. and the viscosity of the dielectric at 20 ° C. is less than 40 mPa.s, wherein the dielectric contains at least one component of the formula I

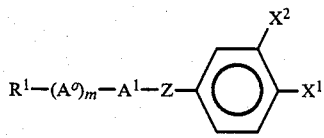

wherein
- $R^1$ is alkyl with 1 to 12 C atoms, wherein one or two non-adjacent $CH_2$ groups can also be replaced by O atoms, —CO—, —O—CO—, —CO—O— and/or —CH=CH— groups,
- $A^o$ and $A^1$ each independently of one another are Cy, Dio or Phe,
- Z is —$CH_2$—O—, —O—$CH_2$ or a single bond,
- $X^1$ is F, Cl, —CN or —NCS,
- $X^2$ is F, Cl and, in the case where $X^1$=NCS, also H,
- m is 0 or 1,
- Cy is trans-1,4-cyclohexylene,
- Dio is trans-1,3-dioxane-2,5-diyl and
- Phe is 1,4-phenylene which is unsubstituted or substituted by fluorine.

2. Liquid crystal display element according to claim 1, wherein the dielectric contains at least one component of the formula II

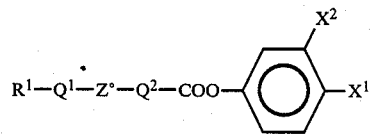

wherein
- $R^1$ is alkyl with 1 to 12 C atoms, wherein one or two non-adjacent $CH_2$ groups can also be replaced by —O—, —CO—, —O—CO—, —CO—O— and/or —CH=CH—,
- $Q^1$ is trans-1,4-cyclohexylene, wherein one or two non-adjacent $CH_2$ groups can also be replaced by O and or S,
- $Q^2$ is trans-1,4-cyclohexylene, wherein one or two non-adjacent $CH_2$ groups can also be replaced by O and/or S, or 1,4-phenylene which is unsubstituted or substitited by flourine and wherein one or more CH groups can be replaced by N,
- $Z^o$ is —CO—O—, $CH_2$O— or —$CH_2CH_2$—,
- $X^1$ is F, Cl, —CN or —NCS and
- $X^2$ is F, Cl or, if $X^1$=NCS, also H.

3. Liquid crystal display element according to claim 1, wherein the dielectric contains at least one component of the formula III

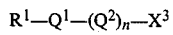

wherein
- $R^1$ is alkyl with 1 to 12 C atoms, wherein one or two non-adjacent $CH_2$ groups can also be replaced by —O—, —CO—, —O—CO—, —CO—O— and/or —CH=CH—,
- $Q^1$ is trans-1,4-cyclohexylene, wherein one or two non-adjacent $CH_2$ groups can also be replaced by O and/or S,
- $Q^2$ is trans-1,4-cyclohexylene, wherein one or two non-adjacent $CH_2$ groups can also be replaced by O and/or S, of 1,4-phenylene which is unsubstituted or substituted by fluorine and wherein one or more CH groups can be replaced by N,
- n is 1 or 2 and
- $X^3$ is —CN or —NCS.

4. Liquid crystal display element according to claim 1, wherein the dielectric contains at least one component of the formula IV

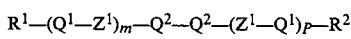

wherein
- $R^1$ and $R^2$ each independently of one another are alkyl with 1 to 12 C atoms, wherein one or two non-adjacent $CH_2$ groups can also be replaced by —O—, —CO—, —O—CH—, —CO—O— and/or —CH=CH—,
- the symbols $Q^1$ each independently of one another are trans-1,4-cyclohexylene, wherein one or two non-adjacent $CH_2$ groups can also be replaced by O and/or S,
- the symbols $Q^2$ each independently of one another are trans-1,4-cyclohexylene, wherein one or two non-adjacent $CH_2$ groups can also be replaced by O and/or S, or 1,4-phenylene which is unsubstituted or substituted by fluorine and wherein one or more CH groups can also be replaced by N, the symbols $Z^1$ each independently of one another are —CO—O—, —O—CO—, —CH$_2$O—, —OCH$_2$, —CH$_2$CH$_2$— or a single bond and m and P are each 0 or 1.

5. Liquid crystal display element according to claim 1, wherein the dielectric contains at least one component of the formula V $$R^1\text{—Cy—}Q^o\text{—}R^2 \qquad \qquad V$$

wherein $R^1$ and $R^2$ each independently of one another are alkyl with 1 to 12 C atoms, wherein one or two non-adjacent CH$_2$ groups can also be replaced by —O—, —CO—, —O—CO— —CO—O— and/or —CH=CH—, $Q^o$ is Cy or Phe, Phe is 1,4-phenylene which is unsubstituted or substituted by fluorine and Cy is trans-1,4-cyclohexylene.

6. Liquid crystal display element according to claim 1, wherein the dielectric contains at least one component of the formula VI $$R^1\text{—Phe—Phe—CN} \qquad \qquad VI$$

wherein $R^1$ is alkyl with 1 to 12 C atoms, wherein one or two non-adjacent CH$_2$ groups can also be replaced by O atoms, —CO—, —O—CO—, —CO—O— and/or —CH=CH— groups and Phe is 1,4-phenylene.

7. Liquid crystal display element according to claim 1, wherein the dielectric contains at least one component of the formula VII $$R^1\text{—}(Q)_n\text{—COO—Phe-}R^2 \qquad \qquad VII$$

wherein $R^1$ and $R^2$ each endependently of one another are alkyl with 1 to 12 C atoms, wherein one or two non-adjacent CH$_2$ groups can also be replaced by —O—, —CO—, —O—CO—, —CO—O—, and/or —CH=CH—, $R^2$ is also CN, Q is trans-1,4-cyclohexylene, wherein one or two non-adjacent CH$_2$ groups can also be replaced by O and/or S, or Phe, Phe is 1,4-phenylene which is unsubstituted or substituted by fluorine and n is 1 or 2, and if n=2, the two groups Q can be identical or different from one another.

* * * * *

UNITED STATES PATENT AND TRADEMARK OFFICE
CERTIFICATE OF CORRECTION

PATENT NO. : 4,877,547
DATED : October 31, 1989
INVENTOR(S) : GEORG WEBER ET AL

It is certified that error appears in the above-identified patent and that said Letters Patent is hereby corrected as shown below:

Column 14, claim 4, line 57:

reads "-O-,-CO-,-O-CH-,-CO-O- and/or"

should read -- -O-,-CO-,-O-CO-,-CO-O- and/or --

Signed and Sealed this

Eighteenth Day of December, 1990

*Attest:*

HARRY F. MANBECK, JR.

*Attesting Officer*     *Commissioner of Patents and Trademarks*